Nov. 17, 1970   M. ETIENNE   3,541,406
DEVICE FOR DETECTING AND ELIMINATING GENERALIZED
WHEEL-SLIPPING IN ELECTRICALLY-PROPELLED
VEHICLES
Filed March 24, 1967
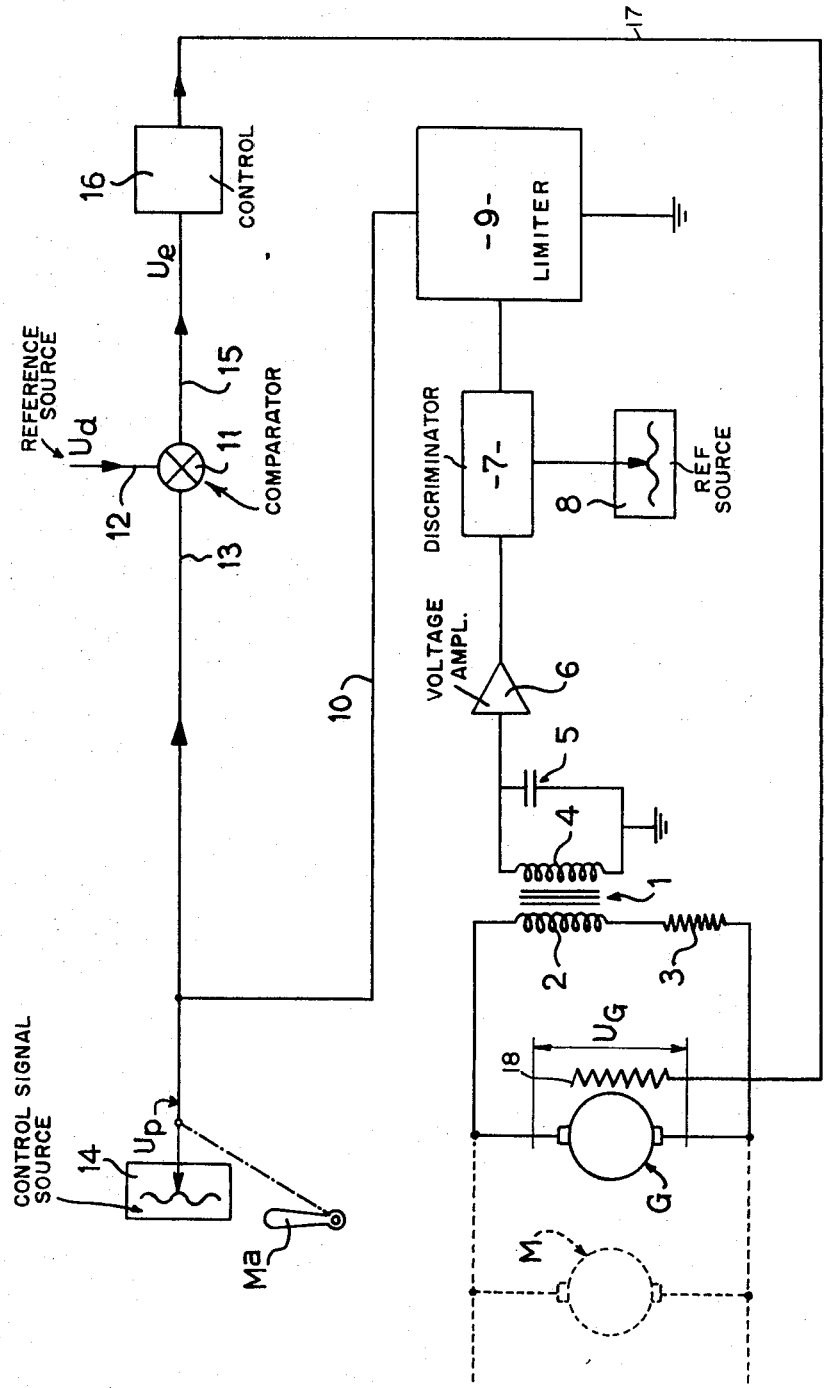
Inventor:
Michel Etienne
by Oldham & Oldham
attorneys

United States Patent Office 3,541,406
Patented Nov. 17, 1970

3,541,406
DEVICE FOR DETECTING AND ELIMINATING GENERALIZED WHEEL-SLIPPING IN ELECTRICALLY-PROPELLED VEHICLES
Michel Etienne, Nantes, France, assignor to Etablissements Brissonneau et Lotz, Paris, France, a French body corporate
Filed Mar. 24, 1967, Ser. No. 625,716
Int. Cl. H02p 5/06
U.S. Cl. 318—52                                6 Claims

ABSTRACT OF THE DISCLOSURE

The device comprises a transformer whose primary winding carries a current proportional to the voltage supplied to the traction motors of the vehicle, the secondary winding being connected through an amplifier to a threshold discriminator supplying a signal to a limiter whose output voltage is applied to a control loop in order to cancel out the reference voltage determining the power supplied to the traction motors, when a generalized slip occurs.

---

The present invention relates to a device for detecting and eliminating wheel slipping in electrically-propelled vehicles and in particular in electrically powered locomotives and more particularly a device for remedying generalized wheel slip of all the driving axles of said vehicle. The term wheel slip employed hereinafter designates unacceptable slip or skiding between the driving wheels and the rail.

Known devices of this type have usually a high response time and their action constitutes mostly a protection against rather than an elimination of the wheel slipping. Indeed, it is known that most of them operate by a comparison between the speeds of the driving axles or between the currents circulating in the motor units. These devices therefore detect the wheel slip of one group of driving axles relative to the other and these detections are employed generally for eliminating the start of racing. This elimination can be executed by means of various known methods. However, in the case of racing due to the wheel slipping of all the driving axles these devices are ineffective. Further, in the case of an isolation of a truck, occurring for example when one of the trucks is defective, these devices are out of action.

The object of the present invention is to provide an improved device for detecting and eliminating generalized wheel slip which does not have the aforementioned drawbacks. The device according ot the invention comprises a transformer whose primary winding carries a current which is proportional to the voltage supplied to the traction motors of the vehicle, the secondary winding of said transformer being connected to the input of a threshold discriminator having an output connected to a limiter, the output of the limiter being connected to the control loop which determines the power supplied to said motors, whereby said power is temporarily reduced when a generalized slip occurs.

In view of the fact that a generalized wheel slip in respect of all the driving axles of the vehicle corresponds to a very rapid increase either in the voltage of the electric generator supplying the motors or in the voltage delivered by a tachometric dynamo, a measuring transformer is employed. A current $i$ proportional to the voltage $U_G$ of the generator giving a flux which is proportional to this voltage is caused to pass through the primary winding of said transformer. The secondary winding of the transformer therefore receives a voltage:

$$U_a = \frac{k\,di}{dt} = k'\frac{dU_G}{dt}$$

The signal corresponding to this voltage can be applied to a logic circuit supplying an output signal in the form of a logical "zero" or "one" level when the derivative exceeds a given predetermined threshold value. The logical signal can then be applied to a control loop controlling the power supplied to the traction motors of the vehicle.

Further features and advantages of the invention will be apparent from the ensuing description with reference to the accompanying drawing.

The single figure shows an embodiment of the invention.

The wheel slip detecting and eliminating device shown in the figure comprises a transformer 1 whose primary winding is series connected to a resistor 3 having a high ohmic value, this system being connected to the terminals of the armature of a generator G which supplies direct current to a plurality of traction motors M connected to the driving axles of a locomotive.

It must be understood that the scope of the invention is not intended to be limited by this system and that the motors can be of the alternating current type fed from an alternator or from outside the vehicle.

The secondary winding 4 of the transformer 1 is grounded and connected in parallel to a capacitor 5 which eliminates random noise. The secondary winding 4 is also connected to the input of a voltage amplifier 6 whose output is connected to a discriminator 7 of conventional type. This discriminator receives a reference voltage from an adjustable reference source 8, and supplies a logical signal when its input voltage exceeds said reference voltage.

The output terminal of the discriminator 7 is connected to a limiter 9 of conventional type whose output is connected to the control loop of the generator G through a conductor 10. This control loop comprises a comparator 11, known to specialists. The input 12 of this comparator receives a voltage whose value is proportional to the actual power supplied ot the motors M by the generator G. The input 13 of this comparator is connected to a control signal source 14 which supplies a control signal $U_P$ representing the set value of the control loop as a function of the position of a speed control lever $M^a$ located on the control panel of the vehicle, the position of the lever determining the power supplied to the traction motors M. Indeed, in a certain position of this lever, the reference voltage $U_P$ is equal to the voltage proportional to the supplied power $U_d$ applied to the terminal 12 of the comparator 11 and no signal appears at the output terminal 15. When the engineer modifies the position of the lever $M^a$, in order to increase or to decrease the speed of the locomotive the value of the voltage $U_p$ changes so that the voltage $U_d$ no longer corresponds to the voltage $U_p$. An error signal $U_e$ then appears at the terminal 15, this voltage being applied to the control device 16 which acts on the generator G, for example on its excitation circuit by a lead 17 connecting to an excitation means 18 of the generator G. The generator G is then caused to increase or to decrease the power supplied to the motors until the error voltage $U_e$ is cancelled corresponding to another speed of the locomotive.

When all the wheels of the driving axles of the vehicle are slipping a very large and very rapid increase in the voltage supped by the generator G occurs. This increase is usually much more rapid than increases due to normal circumstances such as starting for a light running (starting of the vehicle with no load) for example. A current $i$ in the primary winding 2 which is proportional to this voltage $U_G$ produces a flux in the transformer which is proportional to this voltage. The secondary winding 4 then receives a voltage:

$$U_a = \frac{k\,di}{dt} = \frac{k'\,dU}{dt}G$$

wherein $U_G$ is the output voltage of the generator G.

The signal corresponding to the derivative $dU_G/dt$ is amplified in the amplifier 6 and applied to the discriminator 7, the reference source 8 being previously adjusted in such manner as to furnish a reference voltage equal to an acceptable maximum value of the signal corresponding to said derivative and consequently representative for a certain acceptable wheel slip for the driving axles. The discriminator 7 thus supplies a logical signal having for example the logical 1 level to the limiter 9.

Then, the limiter 9 supplies a signal to terminal 13 of the comparator 11, the signal being so chosen as to counteract the set voltage $U_p$ determined by the engineer by means of the speed control lever $M^a$. The set voltage is thus cancelled out. The polarities of the voltages are so chosen that the cancellation of the set voltage results in a short elimination of the inductor current of the generator G whose value is determined by means of the control device 16.

The power supplied by the generator G is therefore temporarily of small value causing a very important and sudden speed decrease of the motors, whereby the power gradually resumes the initial value it had before the wheel slipping occurred.

As this device acts directly on the generator G supplying the motors, a generalized wheel slipping in respect of all the driving axles would therefore be stopped immediately. It is possible to detect the wheel slipping by means of other parameters, such as for example the voltage delivered by the tachometric generator of the vehicle.

Although a specific embodiment of the invention has been described, many modifications and changes may be made therein without departing from the scope of the invention as defined in the appended claims.

Having now described my invention what I claim as new and desire to secure by Letters Patent is:

1. In an electrically propelled vehicle having a plurality of traction motors and a control loop having a control signal applied thereto, so as to control the power applied to said motors and thereby the speed of the latter, a device for detecting and eliminating generalized wheel slip of all the driving axles of said vehicle connected to said motors, said device comprising means for deriving a current proportional to the electric voltage applied to said motors, a transformer having a primary winding and a secondary winding, circuit means for applying said current to said primary winding, threshold discriminator means having an input connected to said secondary winding and an output, and comprising means for providing an output signal on said output when the signal applied to said input exceeds a predetermined level, and electrical connecting means for connecting said output to said control loop so as to counteract said control signal applied to said loop when said level is exceeded.

2. A device as claimed in claim 1, wherein a limiter is connected between said threshold discriminator means and said electrical connecting means.

3. A device as claimed in claim 1, wherein said motors being supplied by a generator, said circuit means for applying current to said primary winding is connected to the terminals of said generator, said circuit including a resistor having a high ohmic value to which resistor said primary winding is series connected.

4. A device as claimed in claim 1, wherein said threshold discriminator means is connected to a variable reference source which determines the threshold of the discriminator means.

5. A device as claimed in claim 3, wherein said control loop comprises an electric comparator having two inputs and an output, one of said inputs of said comparator receiving said control voltage determining the power supplied to said motors, the second input receiving a signal corresponding to the actual value of the power applied to said motors, whereas the output of said comparator is connected to means determining the inductor current of said generator, said electrical connecting means being connected to said first input of said comparator.

6. A device as claimed in claim 1, comprising an amplifier in the connection between said secondary winding and said threshold discriminator means.

References Cited

UNITED STATES PATENTS

| | | | |
|---|---|---|---|
| 3,254,289 | 5/1966 | Hartman | 318—434 |
| 3,378,743 | 4/1968 | Weiser | 318—434 |
| 2,735,090 | 2/1956 | Maenpaa | 318—52 XR |
| 3,378,743 | 4/1968 | Weiser | 318—52 |

ORIS L. RADER, Primary Examiner

A. G. COLLINS, Assistant Examiner

U.S. Cl. X.R.

318—158

UNITED STATES PATENT OFFICE
CERTIFICATE OF CORRECTION

Patent No. 3,541,406      Dated November 17, 1970

Inventor(s) Michel Etienne

It is certified that error appears in the above-identified patent and that said Letters Patent are hereby corrected as shown below:

The above-identified patent should bear the following designation:

Priority is claimed based on French

Application No. 57,561, filed April 14, 1966.

Signed and sealed this 30th day of November 1971.

(SEAL)
Attest:

EDWARD M. FLETCHER, JR.
Attesting Officer

ROBERT GOTTSCHALK
Acting Commissioner of Pat